United States Patent

[11] 3,624,377

| [72] | Inventor | Milton Zerkin<br>Chicago, Ill. |
|---|---|---|
| [21] | Appl. No. | 771,718 |
| [22] | Filed | Oct. 30, 1968 |
| [45] | Patented | Oct. 30, 1971 |
| [73] | Assignee | American Medical Association Education and Research Foundation<br>Chicago, Ill. |

[54] INTERVAL AVERAGING FILTER
10 Claims, 12 Drawing Figs.

[52] U.S. Cl. .................................................... 235/183,
235/151.35, 356/96
[51] Int. Cl. ................................................ G06g 7/18,
G01j 3/00
[50] Field of Search.......................................... 235/181,
183, 151.3, 151.35; 356/74, 96, 97, 87, 114

[56] References Cited
UNITED STATES PATENTS
2,984,146  5/1961  Kwart et al. .................. 356/96 X
3,428,401  2/1969  Buzza........................... 356/87 X
3,446,949  5/1969  Trimble......................... 235/181 X
3,465,134  9/1969  James........................... 235/183
3,466,434  9/1969  Goldstein ...................... 235/183
3,493,773  2/1970  Power .......................... 235/183 X

*Primary Examiner*—Malcolm A. Morrison
*Assistant Examiner*—Felix D. Gruber
*Attorney*—Hill, Sherman, Meroni, Gross & Simpson

ABSTRACT: An interval averaging filter and data processing circuit which receives input signals that are normally processed and recorded at a relatively slow rate in order to resolve the information contained in the signal which increases the speed of processing the signal many times and allows the intelligence to be resolved and presented with great accuracy. The information is rectified and integrated and a pulse train of variable amplitude is obtained by periodically passing the output of the integrator to an indicator such as a memory cathode-ray scope. The integrator includes a capacitor which is discharged periodically after a pulse output has been obtained. This device embodies a dynamic low-pass filter with an electronically adjustable cutoff frequency.

INVENTOR
MILTON ZERKIN

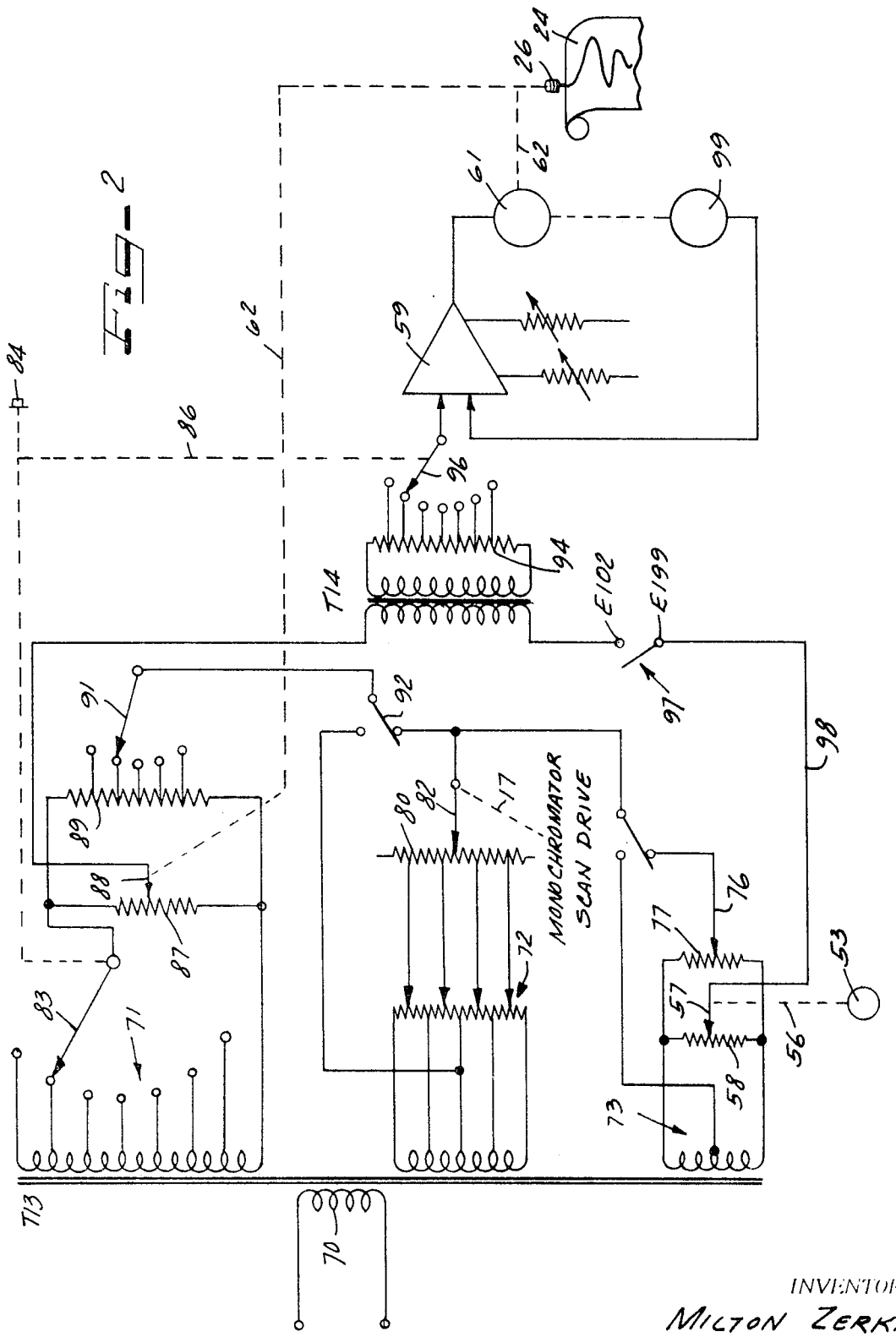

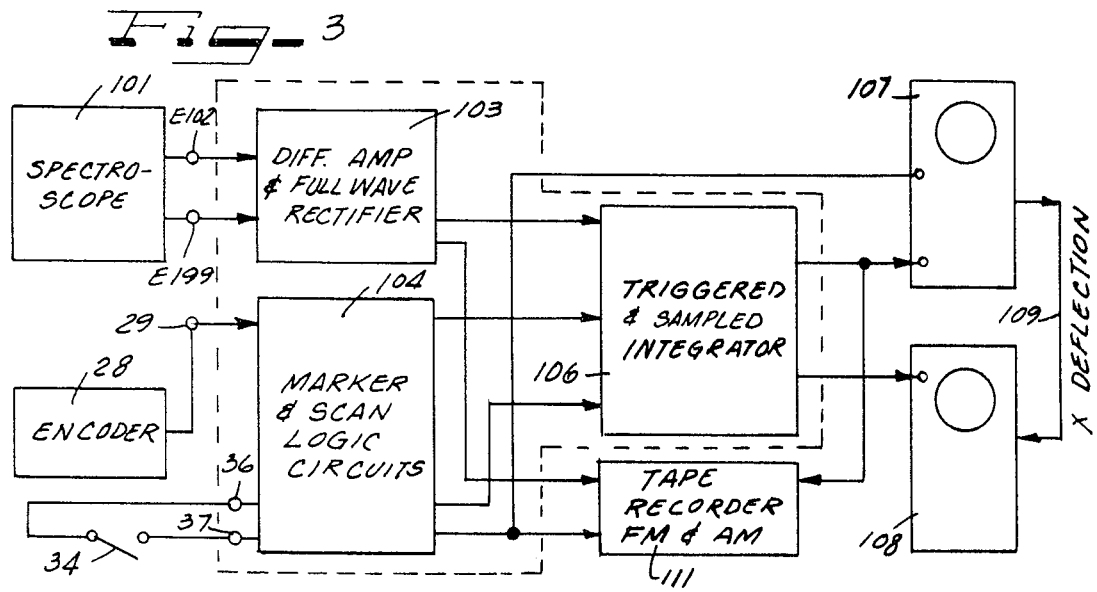
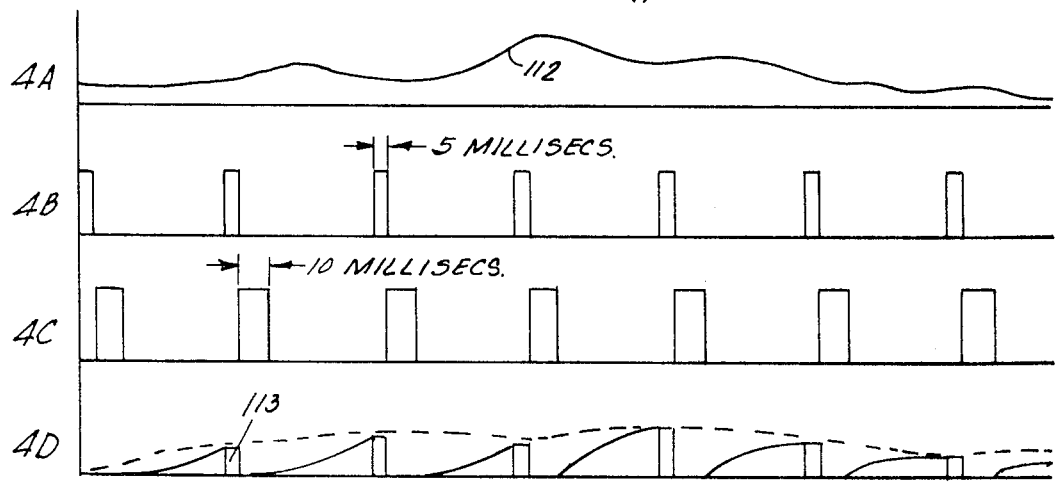
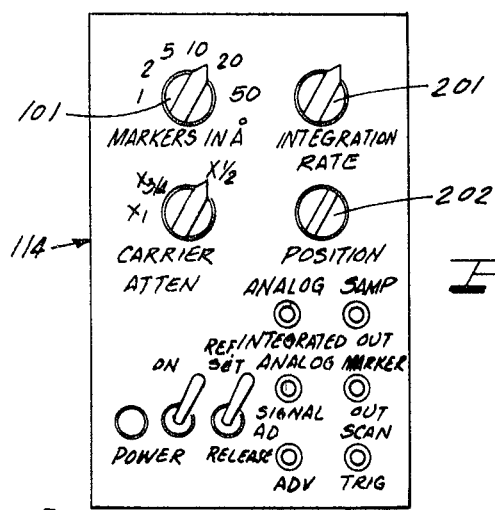

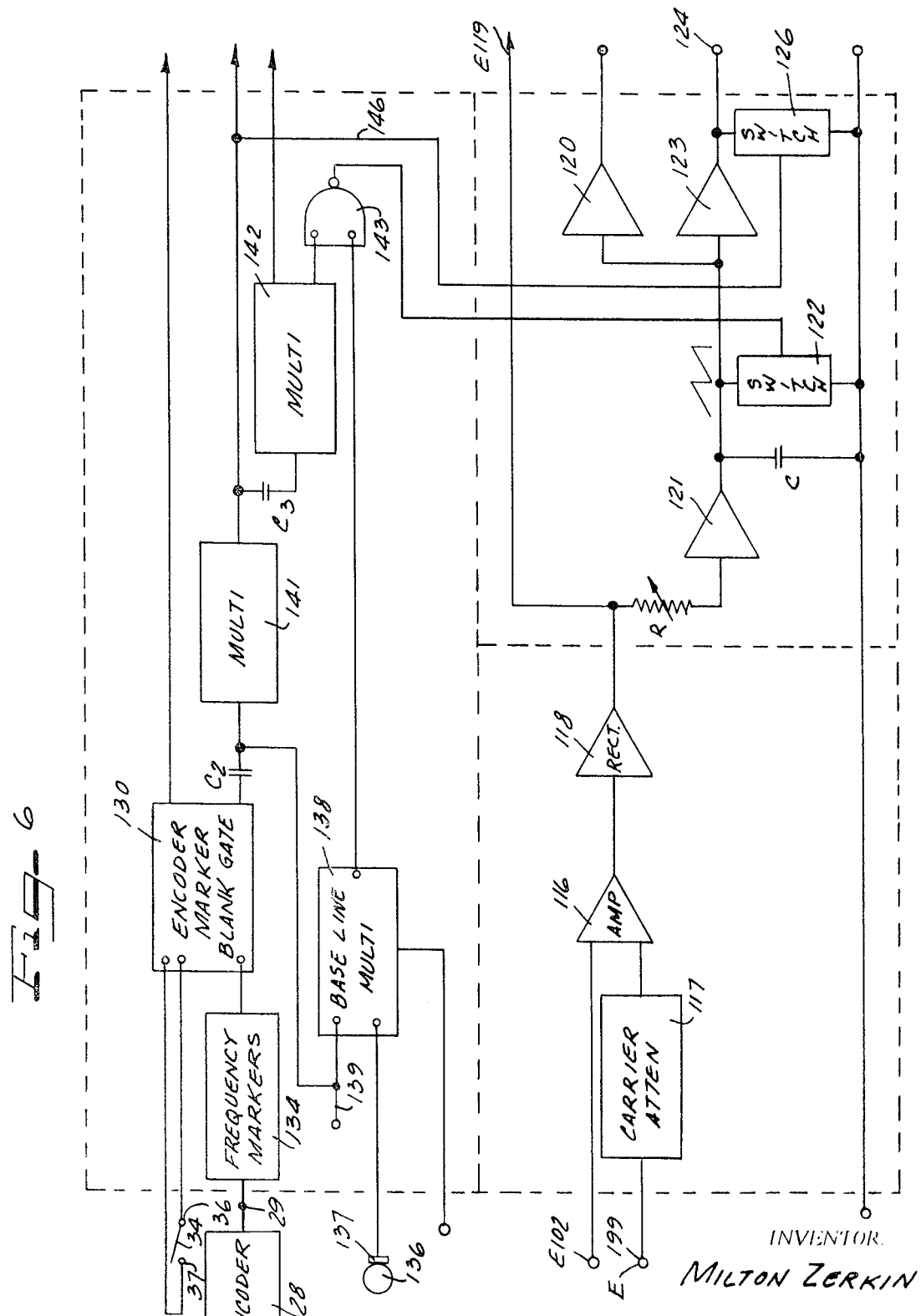

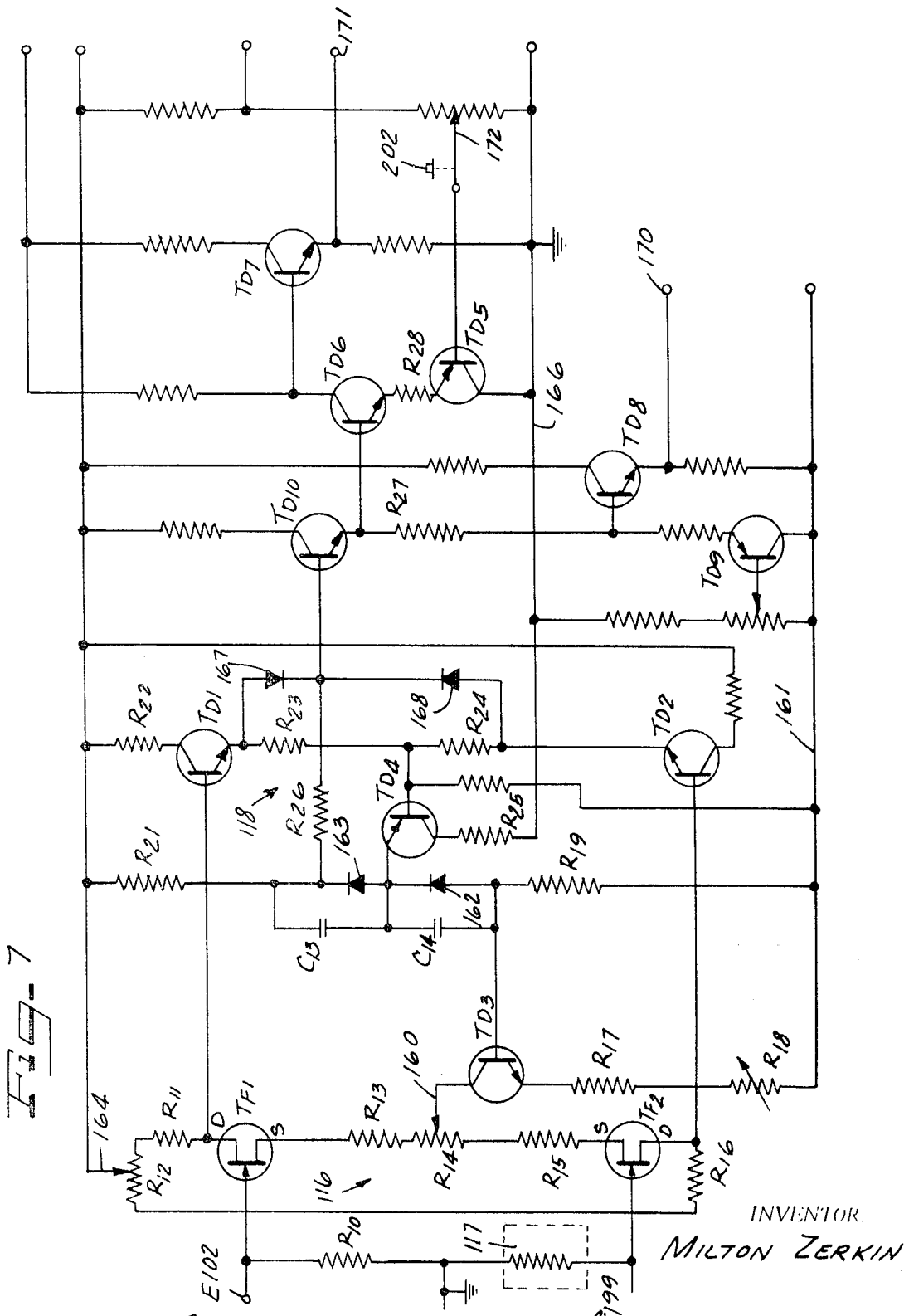

INTERVAL AVERAGING FILTER

BACKGROUND OF THE INVENTION

1. Field of the Invention

This invention relates in general to data processing and in particular to processing the output data of a spectrophotometer so that the spectrophotometer may be operated many times faster than is presently possible with a greatly improved signal-to-noise ratio at the output. There are many applications for data processors of this type such as in ultra centrifuges and in other applications.

2. Description of the Prior Art

Spectrophotometers are machines in which light is passed through a first narrow slit and a second slit on a cylinder which rotates at a fixed rate, as for example, 60 cycles per second. The 60 cycles per second chopping serves as a carrier frequency so that amplifiers in the system need only handle a small band of frequencies near 60 cycles per second. The signal information appears as an amplitude modulation on the carrier. The beam of light passes through a series of prisms, gratings and mirrors which serve as an optical system to spread the spectrum over a wide angle. Another slit passes only the particular small portion of the spectrum which is of interest at a given moment. The width of this slit is one factor which determines the resolution of the instrument since a narrower slit passes a more monochromatic beam.

After passing through the monochromator the light beam goes to a beam splitter. Here it is split into two equal halves. One of the new beams passes through a sample and onto a photomultiplier tube. The second new beam is used as a reference standard and serves two purposes; (1) it is part of a feedback circuit used to hold light intensity constant by automatically changing aperture size at the beam splitter, and (2) it provides a reference voltage via another photomultiplier tube for one leg of a null detecting circuit. The null circuit positions the pen of a strip chart recorder at a position proportional to the difference between a signal voltage and the reference voltage. The strip chart recorder utilizes slide wire inputs. Hence, the pen plots a curve of light absorption as the wavelength range is scanned. For more detailed explanation of chart recorders and their use with spectrophotometers reference may be made to the *Journal of the American Chemical Society*, Dec. 20, 1967, pages 7142–7144.

Theory indicates that as investigators operate the spectrophotometer at higher resolution settings a lower signal to noise ratio is obtained. This is due mainly to the fact that a photomultiplier tube and its associated amplifier has a fixed noise level, but to obtain higher resolution, the investigator must use a narrower slit to monochromate light in the optical system and must thereby decrease his signal. The end result with less signal and fixed noise is a lower signal-to-noise ratio. It has been common in the past to run multiple scans of the spectrum and average the scans to improve the signal-to-noise ratio at higher resolutions.

Circular dichroism (CD) measurements may be made with a spectrophotometer. For example, analysis of proteins and polypeptides may be made and have revealed the presence of well defined ellipticity bands in the aromatic absorption region. The origin of these bands have been associated with various aromatic amino acid side chains, although the specific information necessary for such correlation is rather limited, especially in those cases which exhibit poor signal-to-noise ratios due to either relatively high absorbtivity, or to low rotary strengths or to both. Even in cases in which the signal-to-noise ratios are favorable, such measurements have been limited to wavelengths higher than 210 millimicrons because of unfavorable conditions at low wavelengths. Similar difficulties have also been encountered during measurements of proteins.

SUMMARY OF THE INVENTION

The present invention decreases the time required to make an analysis with a spectrophotometer by a factor of 20 to 100 by processing the output information from the instrument in a novel and unique fashion so as to substantially improve the signal-to-noise ratio and resolution of the intelligence. The output intelligence signal which is carried on a chopped 60 hertz wave is compared with an unmodulated 60 hertz reference signal in a differential amplifier to obtain the intelligence as an amplitude modulated 60 hertz signal. The chopped 60 hertz wave comprises an amplitude modulated 60 hertz signal. This signal is full wave rectified to obtain an analogue output signal. The signal is also passed through an integrator which has an integrator control circuit and the output of the integrator is passed to an amplifier which is periodically switched by a switching circuit to produce a plurality of spaced pulses with amplitudes which vary as a function of the intelligence. The discharge of the integrating condenser of the integrator and the switching of the output are controlled by a pair of pulse trains that are correlated with the scan frequency of the spectrophotometer.

The output sampled integrator signal is presented on a memory scope and a run over the desired frequency spectrum may be accomplished 20 to 100 times faster than with conventional two axis pen recorders such as used in the prior art.

The processing of the information allows greater accuracy to be obtained and many more samples may be run than with existing equipment. The technique is also adaptable to any other data output devices, as for example, ultra centrifuges, where analogue or digital data is to be processed.

Other further objects and features of this invention will become apparent to those skilled in this art from the following detailed description of the annexed sheets of drawings.

BRIEF DESCRIPTION OF THE DRAWINGS

FIG. 2 illustrates the measurement circuit and pen servo drive of the prior art;

FIG. 3 is a block diagram of the invention;

FIGS. 4A–4D illustrate wave shapes in the invention;

FIG. 5 is the front panel of a unit of the invention;

FIG. 6 is a block diagram of the invention;

FIG. 7 is a schematic of the demodulating differential amplifier;

DESCRIPTION OF THE PREFERRED EMBODIMENTS

Figure 1:
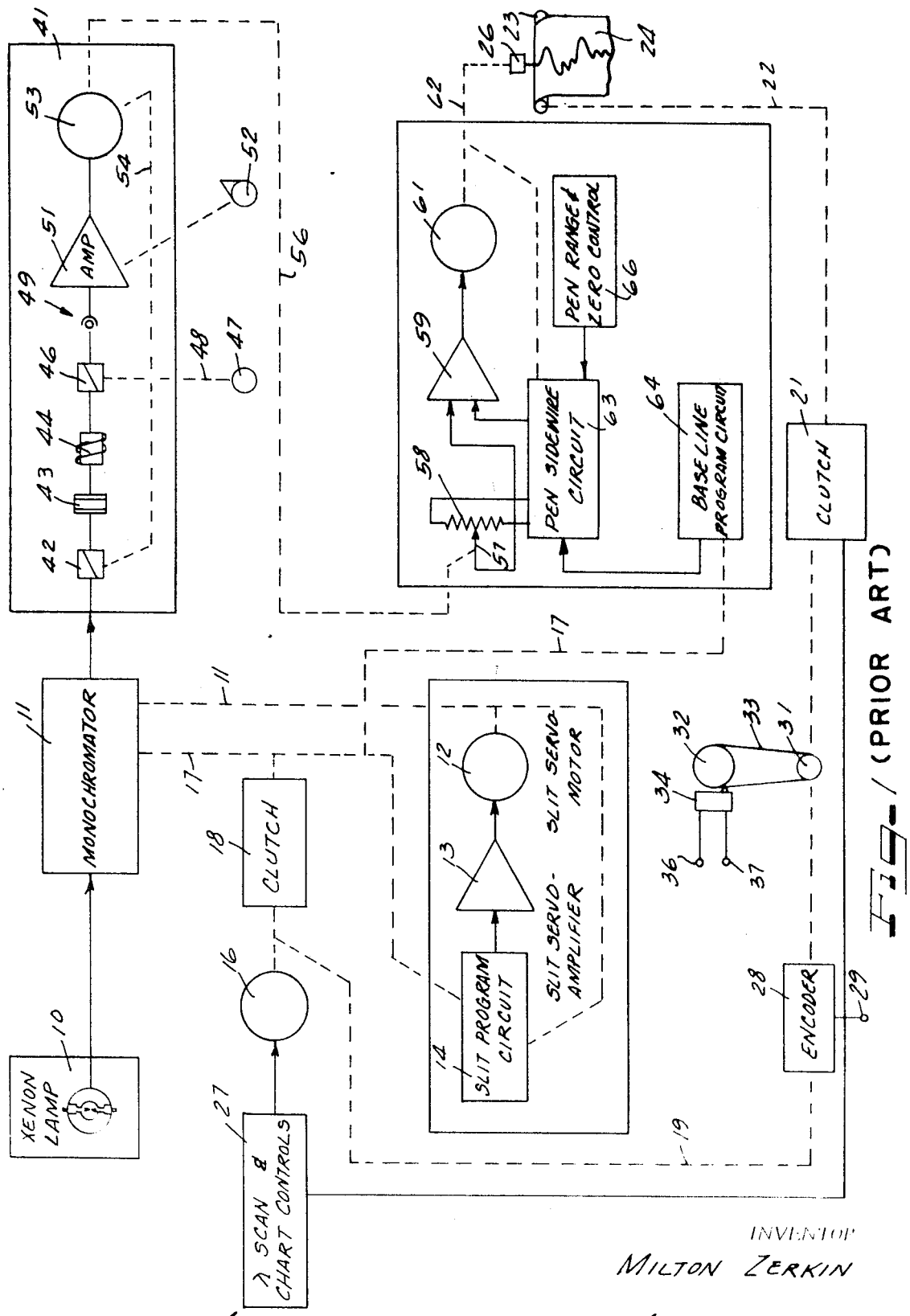
FIG. 1 is a block diagram of a spectrophotometer of the prior art.

FIG. 1 illustrates a spectrophotometer such as a Cary model 11 of the prior art. A spectrophotometer is used to analyze samples by measuring light absorption ratio as a function of wave length. The output of a spectrophotometer is a voltage inversely proportional to the amount of light absorbed by the sample. The machine scans through a range of wavelengths at a steady rate so that a steady rate of address advance on a chart drive can be synchronized. Monochromatic light is passed through the sample. The voltage output of the photomultiplier tube 49 is a voltage inversely proportional to the amount of light absorbed by the sample. However, a servosystem with feedback is used to drive the pen on chart 24 which reproduces the voltage characteristic. In the present invention the output is applied and displayed on a cathode-ray tube rather than on a strip line chart to substantially improve the speed of running tests.

For example, a xenon lamp 10 passes light into a monochromator 11. The monochromator receives an input on shaft 11 from a slit servomotor 12 which receives an input from a slit program circuit 14 through a slit servoamplifier 13. A scan motor 16 supplies an input through the wavelength scan drive shaft 17 to the monochromator 11 through the clutch 18. The scan drive motor 16 output shaft 19 also drives the chart drive 22 through a clutch 21.

The chart platen 23 drives the chart 24 on which the pen 26 records the intelligence. Wavelength scan and chart controls 27 control the clutch 21 and the scan motor 16.

An encoder 28 which may be of any conventional type is driven by the shaft 19 of the scan motor and produces an electrical output at terminal 29 for use in synchronizing the present invention. A gear 31 is mounted on shaft 19 and a chain such as a bicycle chain 33 passes over gear 31 and over a rotatably supported gear 32. A direction sensitive switch 34 is mounted to engage the chain 33 so as to determine the direction of rotation of the shaft 19. Output terminals 36 and 37 of the directional sensing switch 34 are connected to switch 34.

The output of the monochromator passes into a polarimeter section and compensator servosystem 41 which has a polarizer 42, a sample 43, a rotation modulator 44 and an analyzer 46. A mechanical zero control 47 has a shaft 48 which is connected to the analyzer 46.

A photomultiplier tube 49 receives light energy from the analyzer 46 and supplies an electrical input to the compensator servoamplifier 51. A control knob 52 is connected by a suitable shaft to the amplifier 51 to adjust its gain. A compensator servomotor 53 receives an input from amplifier 51 and has an output shaft 54 which is connected to the polarizer 42 and an output shaft 56 which is connected to the signal-transmitting potentiometer contact 57.

The contact 57 engages a resistor 58 and supplies an input to a pen servoamplifier 59. A pen servomotor 61 is driven by the amplifier 59 and is connected by shaft 62 to the pen 26 to move it on the chart. A pen slide wire circuit 63 is connected to the resistor 58 and receives an input from a baseline program circuit 64 and a pen range and zero control circuit 66. The shaft 62 of the motor 61 moves a wiper contact in the pen slide wire circuit 63. The pen slide wire circuit also supplies an input to the pen servoamplifier 59.

The scan motor 16 also supplies an input to the baseline program circuit 64.

As shown in FIG 2, the measurement and pen servosystem comprises transformer T13 which receives an input from primary 70 from a suitable energy source as for example 115 volt AC. Transformer T13 has a first tapped secondary 71, a second tapped secondary 72 and a third secondary 73. FIG. 2 illustrates the motor 61 and amplifier 59 illustrated in FIG. 1 and shows the modification which is made to the conventional spectrophotometer to obtain the outputs for the present invention at terminals E102 and E99. The compensation motor 53 drives the wiper contact 57 which engages resistor 58 connected across the secondary 73. A wiper contact 76 engages a resistor 77 in parallel with resistor 58. The secondary 72 has tap points that allows the baseline of the signal to be established and has a resistor 80 which is engaged by wiper contact 82 of the baseline program circuit 64 which is driven by the shaft 17.

The secondary 71 has a plurality of tap contacts which are engageable by wiper contact 83 that may be controlled by a knob 84 and shaft 86. A resistor 87 is connected from wiper contact 83 to secondary 71 and comprises the slide wire of the pen recorder. The contact 88 is driven by shaft 62 of the pen servomotor 61. A resistor 89 is connected in parallel with the slide wire 87 and has a plurality of tap contacts which are engaged by contact 91 and is connectable by a switch 92 to contact 82 or to the midpoint of secondary 72.

A transformer T14 has its primary connected between wiper contact 57 and wiper contact 88 and has a resistor 94 connected across its secondary which is formed with a plurality of taps that are engageable by wiper contact 96. A switch 97 is connected in line 98 between contact 57 and one end of the primary of transformer T14 and contacts E102 and E199 are connected to opposite sides of the switch. When the switch 97 is open, an output signal for the present invention may be obtained. The switch 97 connected respectively to terminals E99 and E102 comprises a modification of the conventional spectrophotometer so as to allow the connection of the present invention to be made to the conventional machine. The switch 97 may be manually opened so that the present invention may be connected to the terminals E99 and E102 or the switch 97 may be manually closed to allow operation of the machine in the conventional prior art manner. The other switches illustrated in FIG. 2 are found in the prior art machine and are not necessary for the understanding of the present invention.

The pen servoamplifier 59 receives a feedback signal from tachometer generator 99 which is driven by the servomotor 61.

FIG 3 illustrates in block form the present invention. The photospectroscope 101 produces a pair of outputs at terminals E102 and E199 when switch 97 is open to a differential amplifier and full wave rectifier 103. The signal appearing at the terminal E102 is an amplitude modulated 60 hertz signal which carries the intelligence to be processed and the signal applying appearing at terminal E199 comprises a nonmodulated 60 hertz signal. These signals are generated by the prior art device and are utilized in the present invention as illustrated in FIGS. 3–9. The encoder 28 supplies an input to marker scan and logic circuits 104 which also receives an input from the direction sensing switch 34 controlled by the chain 33. The signal appearing at terminal 29 is a synchronizing signal. The switch 34 is closed for a clockwise rotation only remaining open for counterclockwise rotation.

A triggered and sampled integrator circuit 106 supplies an output to a storage oscilloscope 107 that might for example be a type 564 storage oscilloscope manufactured by Tektronix. The pulses 113 are applied to the vertical deflection plates of the oscilloscope. The triggered and sampled integrator circuit 106 also supplies an input to an oscilloscope 108 and to a tape recorder 111 for recording the intelligence.

FIG. 4 illustrates various wave shapes in the invention. For example, FIG. 4A is a plot of the intelligence detected by the spectrophotometer and is designated by numeral 112. The output signal 112 appears at the output of the photomultiplier tube 49 illustrated in FIG. 1. The structure illustrated in FIG. 2 generates the output signals. Notice that the motor 53 which is controlled by the output of the photomultiplier cell 49 drives the motor 53 which positions the wiper 57 on the potentiometer 58. The output of the wiper 57 appears at output terminal E102 and is the amplitude modulated 60 hertz signal. It is amplitude modulated 60 hertz because of the 60 hertz signal applied to transformer T13 on the winding 70. Thus the signal at E102 comprises the amplitude modulated intelligence signal. The signal appearing at terminal E199 comprises a 60 hertz signal which is applied from the secondary of the transformer T13 contact 57 to terminal E199. The spectrophotometer converts the continuous signal 112 into a 60 hertz amplitude modulated wave and this signal appears at terminal E102. The reference 60 hertz signal appears at terminal E199.

FIG. 4B illustrates a train of 5 millisecond pulses generated by unit 104 which are utilized in the invention to sample the integrator output. FIG. 4C illustrates a train of 10 millisecond pulses from unit 104 which are utilized to discharge the integrating capacitor of the invention.

FIG. 4D illustrates the output pulses 113 which are supplied to the memory scope 107.

FIG. 5 illustrates the front panel of the control unit 114 of the invention and has a marker selector knob 101, an integration control knob 201, and a position control 202. The knob 101 provides for markers in Angstroms of the wavelength of the signal. The knob 201 allows the value of the resistor R illustrated in FIG. 6 to be varied to change the integration rate.

Figure 8:
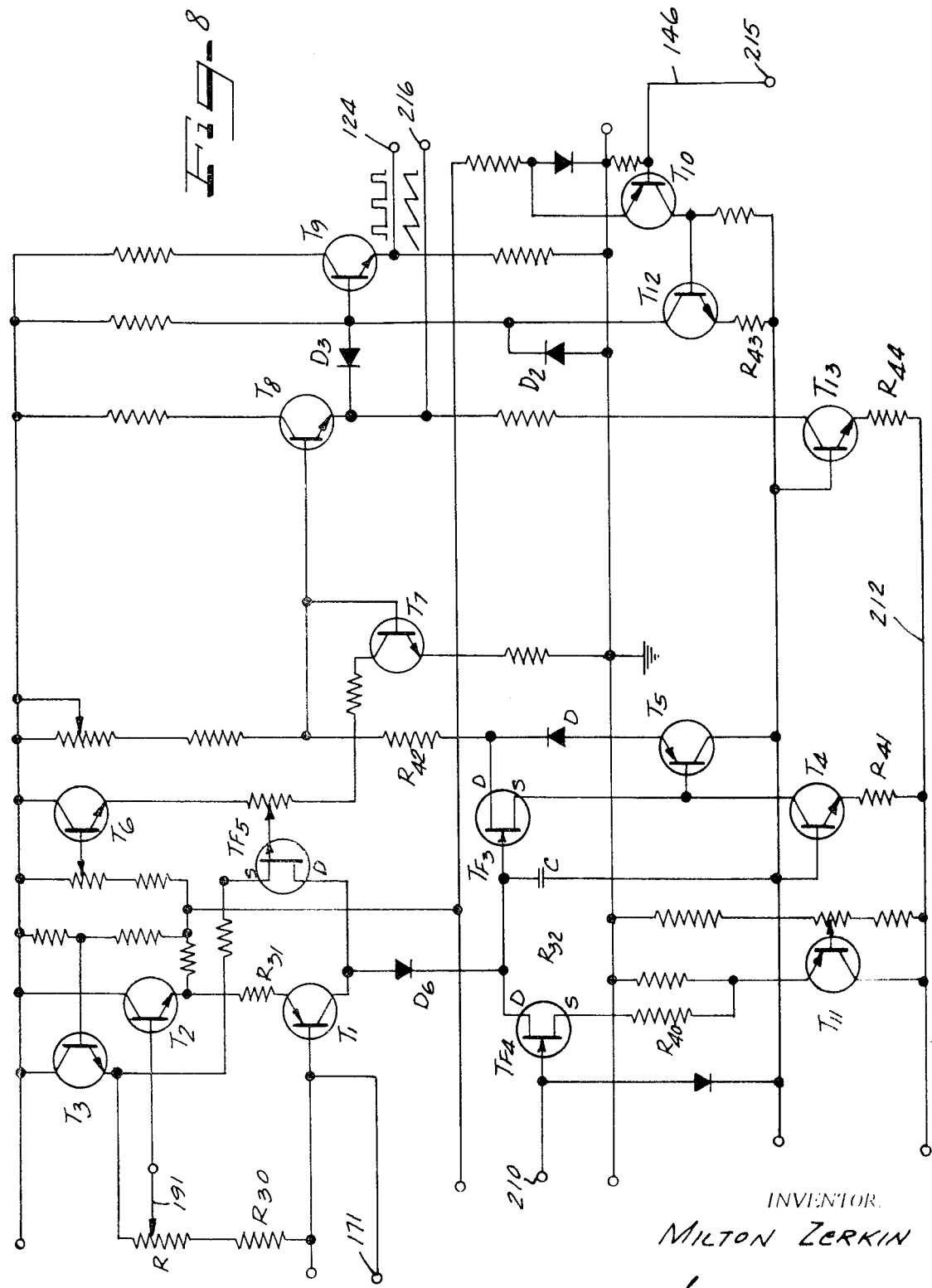
FIG. 8 is a schematic of the marker sampled integrator.
Figure 9:
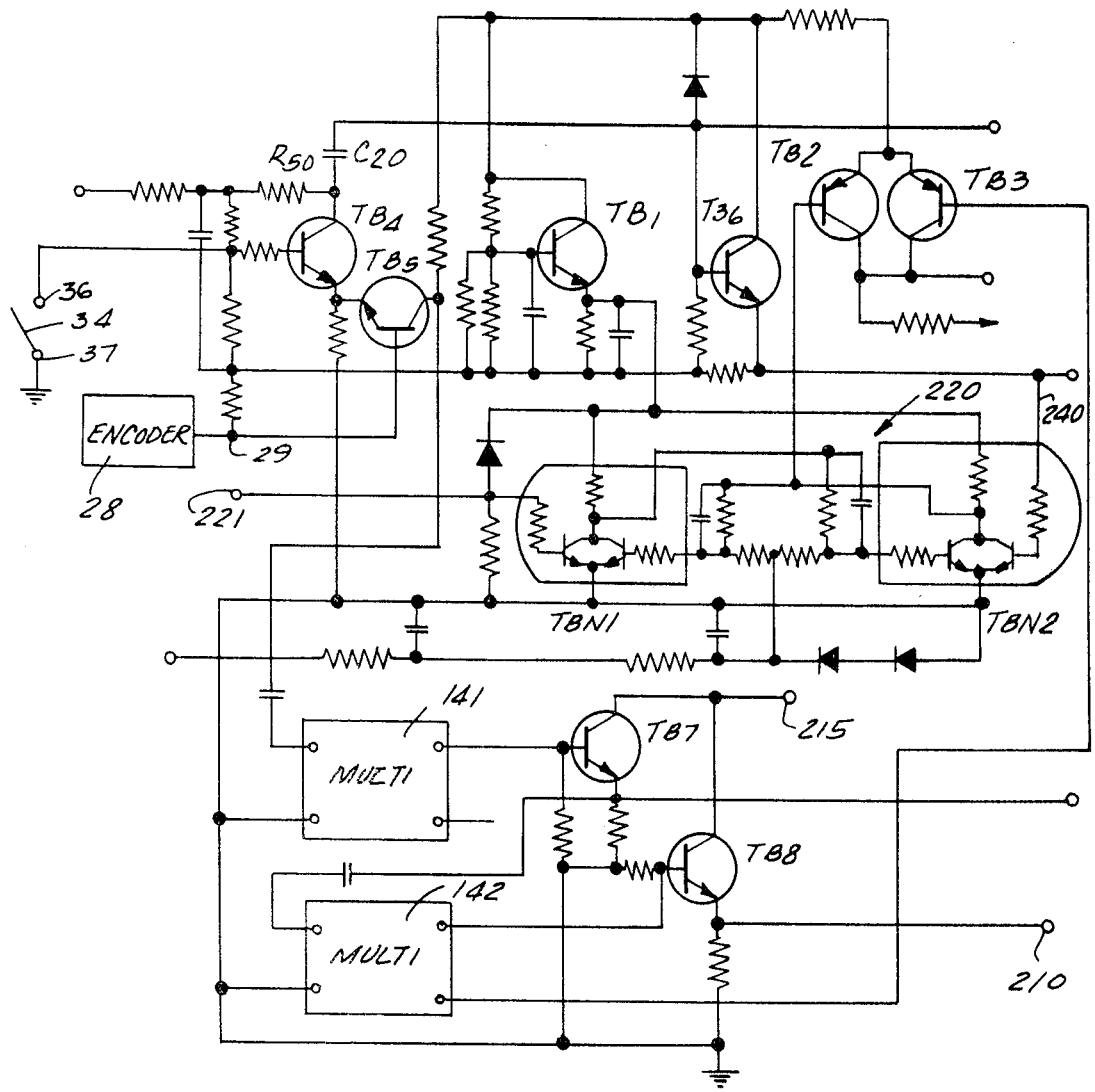
FIG. 9 is a schematic for the timing units.

FIG. 6 is a block diagram of the invention and illustrates terminal E102 connected to a differential amplifier 116. A signal from terminal E199 passes through a carrier attenuator 117 to the amplifier 116. The signal at terminal E102 comprises a chopped 60 cycle signal with the intelligence amplitude modulated on it. The signal at terminal E199 comprises a constant amplitude 60 cycle signal. FIG. 3 is a general block diagram illustrating the spectroscope 101 and the output terminals E102 and E199 which are clearly identified in FIG. 2 and provide the output from the conventional spectroscope 101. The encoder 28 and the direction sensing switch 34 and the synchronizing input signal terminal 29 provide inputs to the differential amplifier and rectifier 103, the marker scan logic circuits 104 and the triggered and sampled integrator 106. FIGS. 6-9 illustrate the elements of FIG. 3 in detail with FIG. 6, for example, illustrating the interrelationship of the blocks of FIG. 3 in more detail and illustrating the integrating circuit comprising the resistor R and the capacitor C. FIGS. 7, 8 and 9 are actual electrical schematics of components in the combination and comprise the various amplifier and switches for actual assembly of the apparatus of the invention. FIG. 8, for example, clearly illustrates the capacitor C and its switching transistor and further illustrates the resistor R and its variable contact 191 which forms a portion of the integrator. The output appearing at terminals 124 and 216 are also clearly illustrated.

The differential amplifier 116 subtracts the fixed amplitude signal from the varying amplitude signal appearing at terminal E102 and passes the output to a full wave rectifier 118 which full wave rectifies the input signal and passes it to terminal E119 as an analogue output signal.

The output of the rectifier 118 is also supplied to a variable resistor R which is connected to an integrator control circuit 121 which is connected to an integrating capacitor C.

The resistance R and capacitor C comprise an integrator for the output of the rectifier 118 and produces a saw tooth-shaped signal.

A discharge switch 122 is connected across the capacitor C to discharge it periodically. The saw tooth signal across the capacitor C is passed to an amplifier 123. A switch 126 is connected to the amplifier 123 and periodically passes the output of the amplifier 123 to an output terminal 124 from which it is supplied to the memory oscilloscope 107. The switch 126 shorts the output of amplifier 120 to ground when closed and allows the output to pass to terminal 124 when open.

The switch is periodically opened and closed to periodically allow the output to pass. The input to amplifier 123 is also passed through an amplifier 120.

Encoder marker blanking gate 130 is connected to the direction sensing switch 34 by leads 36 and 37 and receives an input from frequency marker circuits 134 which is connected to the encoder 28. A hundred Angstrom marker pulse is received from the spectrophotometer from a toothed wheel 136 which engages a microswitch 137 that is connected to baseline multiplier 138. The toothed stop wheel 136 is driven by a conventional belt drive in the spectrophotometer which forms a part of the prior art and is available for use in this invention as a synchronizing means. One Angstrom input signal is also received from the spectrophotometer by lead 139 which is connected to the baseline multiplier 138 and to the output of the encoder marker blank gate 130. A multivibrator 141 produces a chain of 5 millisecond pulses and a multivibrator 142 receives the output of the multivibrator 141 through condenser C3 and produces a chain of 10 millisecond length pulses. A 10 millisecond NOR-gate 143 receives an output of the multivibrator 142 and an output of the baseline multiplier 138 and supplies a signal through lead 144 to switch 122. The NOR-gate 143 provides means for periodically actuating the switch 122 so as to discharge the capacitor so that the integration may start at the reference level again. It is to be realized that the multivibrators 141 and 142 provide the timing for this function. An output of the multivibrator 141 is supplied by lead 146 to the switch 126.

FIG. 7 is a schematic of the demodulating amplifier 116 and full wave rectifier 118. The 60 cycle amplitude modulated square wave signal is supplied to terminal E102 and the chopped reference 60 cycle signal is supplied to terminal E199 from the spectrophotometer. A resistor B10 and a carrier attenuator 117 are connected between terminals E102 and E199.

A field effect transistor TF1 has its gate connected to terminal E102. Terminal E199 is connected to the gate of a field effect transistor TF2. The drain of transistor TF2 is connected to a resistor 16 which has its other side connected to a resistor R12 that is connected to a resistor R11 that is connected to the drain of transistor TF1. The source of transistor TF1 is connected to a resistor R13 which is connected to a resistor R14 that is connected to a resistor R15 that has its other side connected to the source of transistor TF2.

A wiper contact 160 is connected to the collector of transistor TD3 which has its emitter connected to a resistor R17 which is connected to adjustable resistor R18 and to a suitable bias source 161. The base of transistor TD3 is connected to a resistor R19 which has its other side connected to the bias source 161. A diode 162 is connected to a diode 163 between the base of transistor TD3 and a resistor R21 which has its other side connected to a wiper contact 164 which engages resistor R12.

Condensers C13 and C14 are connected across the diodes 162 and 163. The base of transistor TD1 is connected to the drain of transistor TF1 and has its collector connected through resistor R22 to contact 164.

A transistor TD2 has its base connected to the drain of transistor TF2 and has its emitter connected through resistors R23 and R24 to the emitter of transistor TD1. A transistor TD4 has its emitter connected to the junction point between the condensers C13 and C14 and its base to the junction between resistors R23 and R24. The collector of transistor TD4 is connected to a resistor R25 which has its other side connected to a bias source connected to lead 166.

Diodes 167 and 168 are connected between the emitters of transistors TD1 and TD2 and their junction point is connected to the base of a transistor TD10. The junction point between the diodes 167 and 168 is also connected to a resistor R26.

The output of transistor TD10 is connected to a transistor TD6 which amplifies the signal and passes it to a transistor TD7 which supplies it to an output terminal 171. A transistor TD5 and resistor R28 are connected between the emitter of transistor TD6 and the lead 166. The base of transistor TD5 is connected to an output-adjusting contact 172 which is controllable by a knob 202 to adjust the output level.

An output terminal 170 also receives a signal through transistor TD8 which has its base connected the resistor R27.

The circuit of FIG. 7 receives the amplitude modulated chopped 60 cycle signal on terminal E102 and the unmodulated signal on terminal E199 and compares them and supplies the difference signal to the full wave rectifier comprising the diodes 167 and 168. The signal is amplified by the transistors TD6 and TD7 and supplied to output terminal 171. An analogue output signal may also be removed through transistor TD8 at terminal 170 is desired.

FIG. 8 illustrates the marker sample integrator. The full wave rectified signal is supplied to terminal 171 which is connected to the base of transistor $T_1$. A resistor R30 is also connected to the base of transistor $T_1$ and the integrator resistor R is connected to the resistor R30 and has its other side connected to the emitter of a transistor T3. A wiper contact 191 engages the integrator resistor R and is connected to the base of a transistor $T_2$ which has its emitter connected through a resistor R31 to the emitter of transistor $T_1$.

A diode D6 is connected to the collector of transistor $T_1$ and to a capacitor C which is the integrating capacitor of the integrator circuit.

A field effect transistor TF4 has its drain connected to the capacitor C and its gate connected to terminal 210 which receives a train of 10 millisecond pulses which discharge the capacitor C. The source of the transistor TF4 is connected to a resistor R40 which is connected to an emitter of a transistor T11 that has its other side connected to a suitable bias source 212.

A resistor R41 is connected from the lead 212 to the emitter of a transistor T4 which has its base connected to the resistor R32 and the capacitor C. The collector of transistor T4 is connected to the base of a transistor T₅ and to the source of a field effect transistor TF3 which has its gate connected to the capacitor C. The drain of transistor TF3 is connected to the base of a transistor T8 through the resistor R42. The emitter of the transistor T8 is connected to a diode D3 which has its other side connected to the base of transistor T9. An output terminal 124 is connected to the emitter of transistor T₉ and the sampled output signal which is fed to the cathode-ray scope 107 appears at terminal 124.

A gate transistor T12 has its collector connected to the base of transistor T₉ and has its emitter connected through the resistor R₄₃ to the base of transistor T₁₃ which has its emitter connected through the resistors R₄₄ to lead 212. Input terminal 215 is connected to the base of transistor T₁₀ which has its collector connected to the base of gate transistor T₁₂ and a 5 millisecond gating pulse from the multivibrator 141 is connected to terminal 215.

The integrated saw tooth signal appears at terminal 216 from the emitter of transistor T₈. The RC circuit comprising R and C illustrated in FIG. 8 is the integrating circuit which integrates the saw tooth signal that is applied through the transistor T8 to terminal 216. Discharge pulses are periodically supplied to terminal 210 from the 10 millisecond multivibrator 142 shown in FIG. 6 to discharge the capacitor C.

FIG. 9 illustrates the logic circuit and source of the timing pulses for discharging the condenser and controlling the output. It is to be realized that the output of the NOR-gate 143 which is controlled by the multivibrators 141 and 142 and baseline multivibrator 138 provides an output which is a function of the wavelength in Angstroms of the signal beam analyzed by the spectrophotometer. Thus this structure illustrated in detail in FIG. 9 comprises a time base generator indicative of the wavelength and is used to control the integrator to periodically gate its output to the output terminal. The 5 millisecond pulse train multivibrator 141 supplies an output to terminal 215 through transistor TR₇. The 10 millisecond pulse train multivibrator 142 supplies an output through transistor TB₈ to terminal 210. A bistable multivibrator 220 has an input terminal 221 which receives an input from the 100 Angstrom timing wheel 136 shown in FIG. 6. The timing wheel 136 is part of the conventional prior art spectrophotometer. Terminal 221 is connected to one enabling gate of the multivibrator 220 and the other enabling gate is connected by lead 240 through a transistor T₃₆, a condenser C₂₀, and resistor R₅₀ to terminal 36 of the directional indicating switch 34.

The encoder 28 supplies an input to the base of transistor TB₅ which has its emitter connected to the emitter of transistor TB₄.

The 100 Angstrom input signal to terminal 221 assures that the bistable multivibrator 220 is synchronized with the wavelength sweep of the spectrophotometer and the output of the 5 millisecond multivibrator 141 will be synchronized with the Angstrom marks from counting wheel 136. The multivibrator 142 produces 10 millisecond pulses whose leading edges start immediately after the trailing edges of the 5 millisecond pulses. The 5 and 10 millisecond pulses have the same repetitive frequency.

In operation, the 60 cycle amplitude modulated signal comprises the vertical deflection signal presented on the scope 107. The encoder controls the horizontal deflection of the scope. The differential amplifier amplifies the differential signal and the full wave rectifier rectifies it to invert the negative portions. The signals pass to the integrator which has two parts, the integrator capacitor including the discharge switch actuated by the 10 millisecond pulse from the multivibrator 142 and the integrator amplifier which is enabled by the 5 millisecond pulse from the multivibrator 141. The output pulses are supplied to the storage oscilloscope or for example a type 560 manufactured by Tektronix.

If the wavelength of the energy passed through the sample is varied from 580 to 180 millimicrons, for example, the output on the scope will record the characteristic curve of the particular sample being tested. The circuitry of the invention acts as a low-pass filter including the RC circuit shown in FIG. 8. It is well known that RC circuits may act as low-pass filters. The output may also be supplied and an averaging computer which could subtract the baseline to average out the low-frequency noise.

The principles of the invention are also applicable to ultracentrifuges. The signal may be scaled electronically rather than using a manual scaling.

The processing of the information according to this invention allows samples to be processed 20 to 100 times faster than is presently done. For example, a Cary model 11 spectrophotometer costs about $40,000, and it has previously taken 15 or more minutes to process one sample and obtain an output on a chart recorder. The present invention allows samples to be run 20 to 100 times faster and a great savings in equipment and manpower is obtained. The presentation on the scope may be recorded by camera such as a Land camera if desired to retain a permanent record. It is to be realized that the contact 191 allows the integrator to be controlled and forms an integrator control to vary the time constant of the integrator.

It is also to be realized that the capacitor C is an integrating capacitor.

It can be seen that the invention provides a new and novel way of processing information and that it has a dynamic low-pass filter with an electronically adjustable cutoff frequency. Although it has been described with respect to the preferred embodiments it is not to be so limited as changes and modifications may be made which are within the full intended scope as defined by the appended claims.

I claim:

1. A system for processing data in the form of a fixed frequency amplitude modulated wave with the modulation indicative of a first function, output and input terminals, a full wave rectifier receiving said input amplitude modulated wave, an integrator receiving the rectified amplitude modulated wave from said full wave rectifier to integrate it, an integrator control for said integrator, a time base generator which produces an output that varies as a second function, a second switch connected between the output terminal and said integrator and to said time base generator to periodically gate its output to said output terminal wherein said integrator includes an integrating capacitor, a first switch connected to said integrating capacitor to periodically discharge it, and said time base generator connected to said first switch to periodically actuate it.

2. A system for processing data according to claim 1 wherein said time base generator includes a first multivibrator which is connected to the first switch.

3. A system for processing data according to claim 2 wherein said time base generator includes a second multivibrator which is connected to the second switch.

4. A system for processing data according to claim 3 wherein the first and second multivibrators produce trains of pulses which have the same repetitive frequency.

5. A system for processing data according to claim 4 wherein the leading edges of the pulses from the first multivibrator are closely spaced in time with the trailing edges of the pulses from the second multivibrator.

6. A system for processing data according to claim 1 including a differential amplifier receiving said fixed frequency amplitude modulated wave and an unmodulated reference wave and supplying an output to said full wave rectifier.

7. Means for processing data from a spectrophotometer which produces an amplitude modulated information signal indicative of a function and a synchronizing signal indicative of wavelength comprising, means for demodulating the information signal and for integrating the demodulated signal and for generating an output, a time base generator receiving the synchronizing signal, an output terminal, an output switch for connecting the output to said terminal, and the time base generator connected to control the output switch so as to periodically pass said output.

8. Means for processing data from a spectrophotometer according to claim 7 wherein said demodulating and integrating means includes a capacitor and a switch, controlled by said time base generator, to periodically discharge said capacitor.

9. Means for processing data from a spectrophotometer according to claim 8 further comprising an oscilloscope connected to the output terminal and to the time base generator.

10. Means for processing data from a spectrophotometer according to claim 9 wherein said oscilloscope is a recording oscilloscope.

* * * * *